United States Patent [19]

Kelm

[11] 3,982,899

[45] Sept. 28, 1976

[54] FLUID HANDLING APPARATUS

[75] Inventor: Everett F. Kelm, Corning, N.Y.

[73] Assignee: Corning Glass Works, Corning, N.Y.

[22] Filed: May 22, 1975

[21] Appl. No.: 579,961

[52] U.S. Cl. .............................. 23/259; 73/425.4 P; 73/425.6; 222/309; 222/389

[51] Int. Cl.² ........................ B01L 3/02; G01N 1/10; G01N 1/14

[58] Field of Search .................. 23/259; 73/425.4 P, 73/425.4 R, 425.6; 128/218 P, 218 A; 222/309, 389

[56] References Cited

UNITED STATES PATENTS

| | | | |
|---|---|---|---|
| 2,596,560 | 5/1952 | Johnson | 23/259 |
| 3,193,148 | 7/1965 | Anthon | 222/309 X |
| 3,244,009 | 4/1966 | Tietje et al. | 222/309 X |
| 3,327,900 | 6/1967 | Goda | 222/309 X |
| 3,492,876 | 2/1970 | Bull et al. | 23/259 X |
| 3,612,359 | 10/1971 | Sundholm | 222/309 |
| 3,727,614 | 4/1973 | Kniazuk | 128/218 A |
| 3,805,998 | 4/1974 | Croslin | 23/259 X |

*Primary Examiner*—Norman Yudkoff
*Assistant Examiner*—Dale Lovercheck
*Attorney, Agent, or Firm*—Thomas J. McNaughton; Burton R. Turner; Clarence R. Patty, Jr.

[57] ABSTRACT

An apparatus for transferring fluid including a pipet or other similar vessel having an open top end and an open bottom end; a pipet-operating assembly including means for retaining the top end of the pipet; a flexible suction and pressure tube operatively connected to the pipet retaining means; vacuum-operated syringe means connected to the suction and pressure tube for aspirating a preselected amount of liquid into the pipet and for discharging the liquid from the pipet; tubular means for supplying a partial vacuum to the syringe means; and flexible, tubular means for selectively venting the supply of partial vacuum to the syringe means, the pipet-operating assembly including venting valve means for opening and closing the tubular venting means.

7 Claims, 6 Drawing Figures

140
152
150
136
138
126
156
122
124
128
142
132
120
66
130

66
130
154
120
150
8

72
162
68
78
74
160

TO VACUUM SOURCE
60
10
18
12
14
16
90
94
98
66
130
120
122
136
152
150
154

FLUID HANDLING APPARATUS

BACKGROUND OF THE INVENTION

The invention relates to fluid handling apparatus and more particularly to apparatus for aspirating a selected quantity of fluid into a pipet or other similar vessel and for discharging the fluid from the pipet.

Recently there has been increased emphasis on safety in the laboratory, particularly with regards to pipetting biological fluid specimens. A wide variety of hand-held, manually-operated syringes have been developed to provide safe collection and discharge of such fluids. However, the known conventional syringes are relatively tedious to operate because the plungers or pistons therein must be manually pulled and pushed for each pipetting operation, thus causing considerable fatigue after many repetitions. Also the devices are relatively bulky, especially those which are capable of pipetting from 1 to 10 milliliters or more of fluid. In particular, since the conventional syringe is coaxially mounted over the upper end of a pipet, the overall length of such a pipetting device (with pipet attached) is not suitable for operation in restricted areas, such as under laminar flow or biological containment hoods used in medical laboratories. Moreover, some of the devices require cleaning of elements thereof to avoid cross-contamination of successively pipetted fluids.

Another type of pipetting device uses a bulb aspirator to siphon fluid into an attached pipet. A major problem associated with this type of pipettor is that the pipet cannot be charged with a precise volume of fluid in one operation; but, as in conventional mouth pipetting, the pipette is filled above the desired volume and the excess fluid is then discharged until the meniscus at the upper surface of the fluid has dropped to a selected mark on the outer surface of the pipet body. Not only is this a time consuming procedure, but also it is difficult to achieve a high level of accuracy. It is obvious that the accuracy of such a technique is not only dependent on the skill of the operator but also on the volumetric accuracy of the graduated pipet used therewith. Also, this technique requires discharging of the excess fluid into the atmosphere above the fluid sample; and thus the risk of spreading contaminated or toxic fluid into the atmosphere is increased.

Finally, another type of dispenser has been more recently developed to utilize separate sources of vacuum and pressure to completely charge and discharge a pipet. Such a device is shown in Canadian Pat. No. 938,594. A shortcoming of the dispenser is that the volume of fluid to be transferred is determined only by the total capacity of the pipet utilized. Also, this type of pipettor requires washing of the tubing and valving means therein between collections of different fluids in order to prevent cross-contamination of different fluid specimens. Furthermore, the hand-held pipet-operating subassembly of this type of fluid handling apparatus is relatively bulky and difficult to use in restricted areas.

Accordingly, a major object of the present invention is to provide an apparatus for collecting and dispensing fluids which overcomes the aforementioned problems or shortcomings.

Also it is an object of this invention to provide a pipetting apparatus adapted to charge a pipet with a precise amount of liquid and to discharge the liquid at a metered rate, wherein neither the volumetric precision nor rate of discharge of the pipetting device depends solely on the dimensional characteristics of the pipet or liquid-retaining vessel used therewith.

It is a further object of this invention to provide a versatile pipetting device having volumetric adjusting means which permit the selection of volumes in the microliter or macroliter range, or in both ranges. Another object is to furnish a pipetting device which can be easily and accurately calibrated to compensate for changes in barometric pressure exerted on the fluid to be pipetted. Also, another object is to provide a pipetting apparatus which may be adjusted to collect and dispense any increment of volume less than the total available volume of the pipet employed therewith.

SUMMARY OF THE INVENTION

The present invention provides apparatus for charging a pipet or other similar vessel with a preselected amount of liquid and for discharging the liquid from the pipet comprising a pipet-operating subassembly connected to the pipet, a vacuum-operated syringe subassembly connected to the pipet-operating subassembly by a suction and pressure tube, means for supplying a partial vacuum or fluid suction to the syringe subassembly, and means preferably connected to the pipet-operating subassembly for selectively venting the partial vacuum or fluid suction supplied to the syringe subassembly.

The syringe subassembly includes a cylinder having a dispensing end and a driving end; plug means within the dispensing end of the cylinder; a piston within the cylinder initially positioned adjacent a portion of the plug means; stop means within the driving end of the cylinder for limiting the movement of the piston toward the cylinder driving end; and spring means for urging the piston toward the plug member.

A vacuum supplying or fluid suction passageway for supplying a vacuum to the syringe subassembly, may be formed through the stop means and has tubular means, communicating with a vacuum source, connected thereto. To control the amount of partial vacuum or fluid suction supplied to the syringe cylinder, a flexible venting tube may be connected by a three-way tubular coupling to the tubular means for supplying a partial vacuum to the cylinder.

The pipet-operating subassembly includes a pipet-retainer portion and preferably a venting valve portion. A passageway formed through the plug means is connected to one end of the suction and pressure tube, and the other end of the suction and pressure tube is connected to the pipet retainer portion of the pipet-operating subassembly. The retainer portion includes socket means for retaining an upper open end of a pipet and a passageway communicating between the socket means and the suction and pressure tube. The valve portion includes a passageway which communicates with the venting tube. The venting valve passageway terminates at an orifice in an upper portion of the pipet-operating subassembly and may be opened and closed by the operator's forefinger in a manner similar to that used in mouth pipetting.

Another embodiment of the apparatus provides for an alternative means for venting the partial vacuum or fluid suction supplied to the cylinder. Instead of connecting the venting tube to the tubular means for supplying vacuum to the cylinder, a separate venting passageway is formed through the stop means and the venting tube is operatively connected to the venting passageway.

The vacuum-operated syringe subassembly may further include means for adjusting the amount of liquid to be pipetted comprising a stop means having plug and flange portions provided with an axial bore, and a stop shaft adapted to telescope within the axial bore. A cylindrical inner sleeve member, coaxial with the bore, extends outwardly from the flange portion of the stop means and is provided with an at least partially threaded axial bore. The stop shaft has a threaded portion adapted to screw into the threaded bore of the inner sleeve. A cylindrical outer sleeve member, which is adapted to telescope over the inner sleeve member, is adjustably rotatably secured to the stop shaft threaded portion by lock nut means. Whole unit and incremental volumetric indicia are provided respectively on the inner and outer sleeve members. The volume to be pipetted is set by registering the desired volumetric indicia on the inner and outer sleeves. The zero reading of the pipetting apparatus may be adjusted by varying the outer sleeve member's position on the stop shaft.

DESCRIPTION OF THE DRAWINGS

The invention is illustrated in the accompanying drawings wherein.

DESCRIPTION OF THE PREFERRED EMBODIMENTS

Figures 1, 1A, 2A, 4:
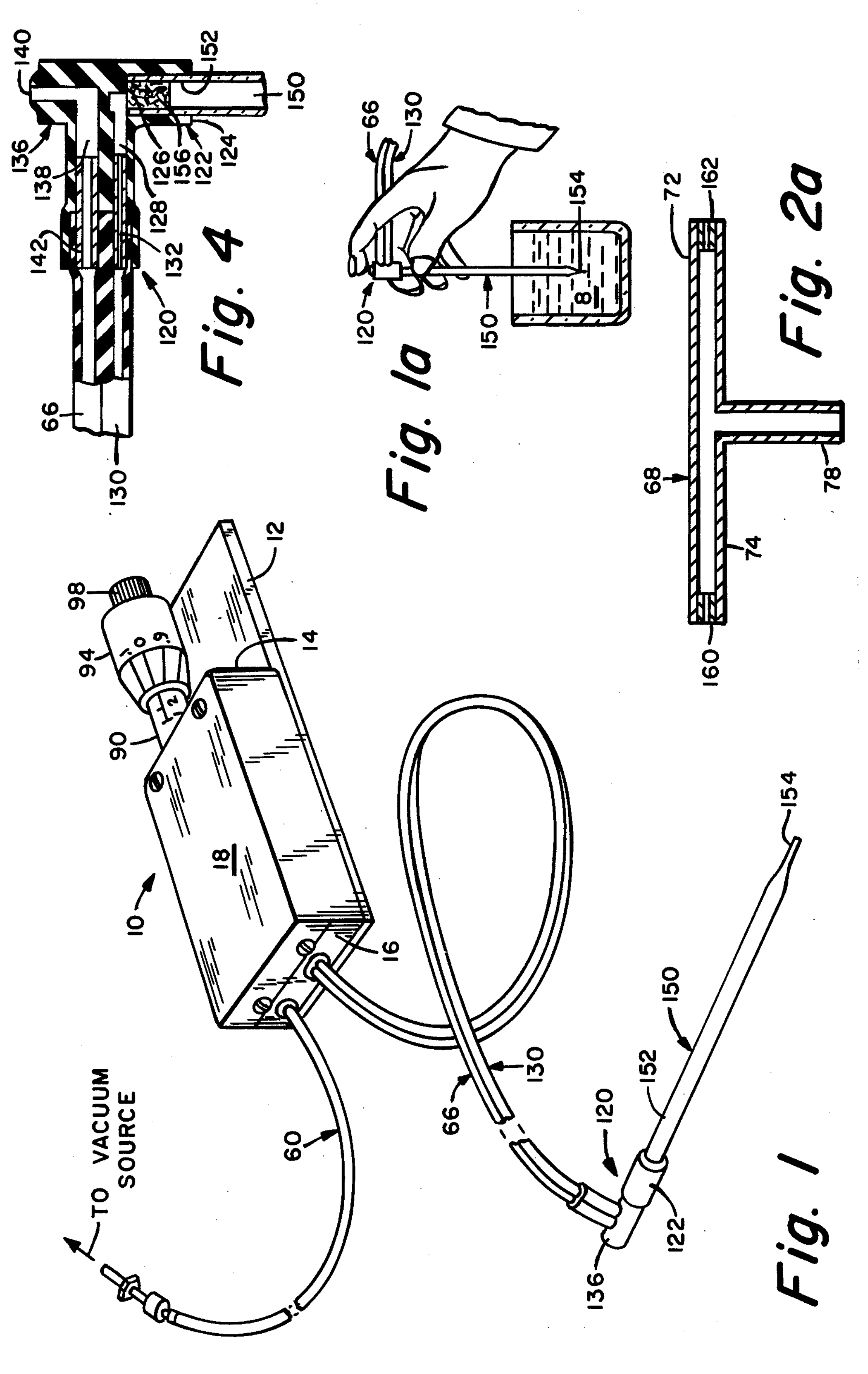
FIG. 1 is an isometric view of the pipetting apparatus of the present invention.
FIG. 1*a* is a side elevational view illustrating a manner in which the pipet-operating subassembly thereof may be manipulated.
FIG. 2*a* is a sectional, side elevational view of the T-shaped tubular connector illustrated in FIG. 2.
FIG. 4 is a sectional side elevational view of the pipet-operating subassembly depicted in FIGS. 1 and 1*a*.

The pipetting apparatus or dispenser shown in FIG. 1 includes a vacuum-operated syringe subassembly or syringe means 10, means 60 for supplying a partial vacuum or fluid suction to the syringe means, a mobile pipet-operating subassembly 120 operatively connected to the syringe means, and a pipet 150 removably retained within the pipet-operating subassembly 120. The syringe means 10 may include a housing comprising a base panel 12, a front panel 14, a rear panel 16, and a cover panel 18 removably attached by suitable fasteners to the front and rear panels.

Figure 2:
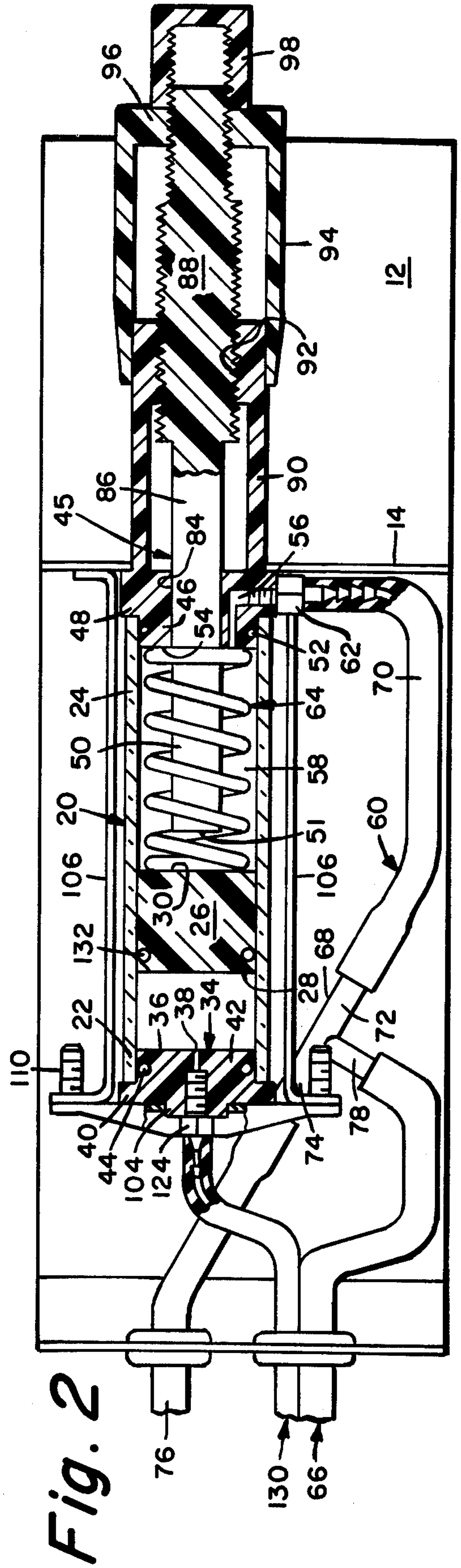
FIG. 2 is a top plan view, partially in section, of a preferred embodiment of the vacuum-operated syringe subassembly shown in FIG. 1.

Referring to FIG. 2, the syringe means includes a cylinder 20 having a dispensing end 22 and a driving end 24, and a piston member 26 disposed within cylinder 20 in a hermetically sealed sliding relationship with the cylinder. Cylinder 20 has a precisely formed inner bore and is preferably made from glass, but may be made from plastic or metal. Piston 26 has a dispensing face 28 which may be flat and lie in a plane normal to the axis of the cylinder 20 and a driving face 30 which also may be be flat and lie in a plane normal to the axis of the cylinder. To provide a low-friction hermetical or air-tight seal between the piston and cylinder, piston 26 may be provided with a circumferential groove and an annular sealing ring or gasket 32, such as a O-ring made from synthetic rubber or other suitable material, seated within the groove. The piston is preferably made from plastic, such as nylon, but may be made from glass or other suitable material.

A dispensing end plug means 34 is disposed within the dispensing end 22 of the cylinder in a fixed hermetically sealed or air-tight relationship therewith. Plug means 34 includes an inner face 36 adapted to mate with at least a portion of piston dispensing face or end 28; when the piston dispensing face 28 is flat, inner face 36 may also be flat. A dispensing passageway 38 is formed through plug means 34 and preferably communicates axially with the inner face 36. The plug means may be provided with a flange portion 40 abutting against the dispensing end 22 of the cylinder and an annular plug section 42 projecting inwardly from flange 40 having a circumferential groove, with a suitable annular packing or sealing gasket 44, such as a synthetic rubber O-ring, disposed in the groove between the cylinder and the plug section.

A stop means 45 for limiting the sliding of the piston within the cylinder is disposed within the driving end 24 of the cylinder 20 and may include a plug portion 46, a flange portion 48 and a stop portion or member 50 having an inner end 51 projecting longitudinally from the plug portion 46 into the cylinder, that is, toward the driving face 30 of the piston 26. Plug portion 46 may have a circumferential groove and an annular sealing gasket 52 within the groove for forming a hermetical seal with cylinder 20. Stop member 50 extends longitudinally from an inner face 54 of plug portion 46 a selected distance into the cylinder 20. That is, stop member 50 extends into cylinder 20 a preselected distance from the dispensing end 22 of the cylinder. A vacuum-supplying passageway 56 is formed through the plug and flange portions 46 and 48 for supplying fluid suction or partial vacuum in the form of sub-atmospheric pressure from a vacuum source to a driving chamber portion 58 of the cylinder lying between piston driving face 30 and the inner face 54 of plug portion 46. Preferably, passageway 56 communicates between the inner face 54 of plug portion 46 and a peripheral surface portion of flange 48. A vacuum source or fluid suction tube means 60 is connected by a suitable connector 62 to passageway 56.

A spring means 64 is positioned within the driving chamber portion 58 of cylinder 20 between piston 26 and stop means plug portion 46 and is adapted to resiliently urge piston 26 toward the dispensing end 22 of the cylinder against plug means 34. Preferably, spring means 64 is a helical compression spring having one end abutting the piston driving face 30 and the other end abutting the inner face 54 of the stop means plug portion 46.

The vacuum-operated syringe means further includes means for selectively venting fluid suction or partial vacuum supplied to the driving chamber portion 58 of the cylinder. In the embodiment of the venting means depicted in FIG. 2, venting tube 66 is connected to the vacuum source tube 60 by means of a three-way or T-shaped connector 68. A first segment 70 of the vacuum source tube 60 communicates between the connector 62 within the vacuum supplying passageway 56 and a first leg 72 of the connector 68. A second leg 74 of the connector, which is preferably coaxial with the first leg 72, is connected to a second segment 76 of the vacuum souce tube, with the second segment 76 being connected to a vacuum source, which may include means for generating a partial vacuum or fluid suction. The third leg 78 of the connector is connected to the venting tube 66; and, as will be described below, the venting tube 66 communicates with a venting valve portion 136 of the pipet-operating subassembly 120.

Figure 3:
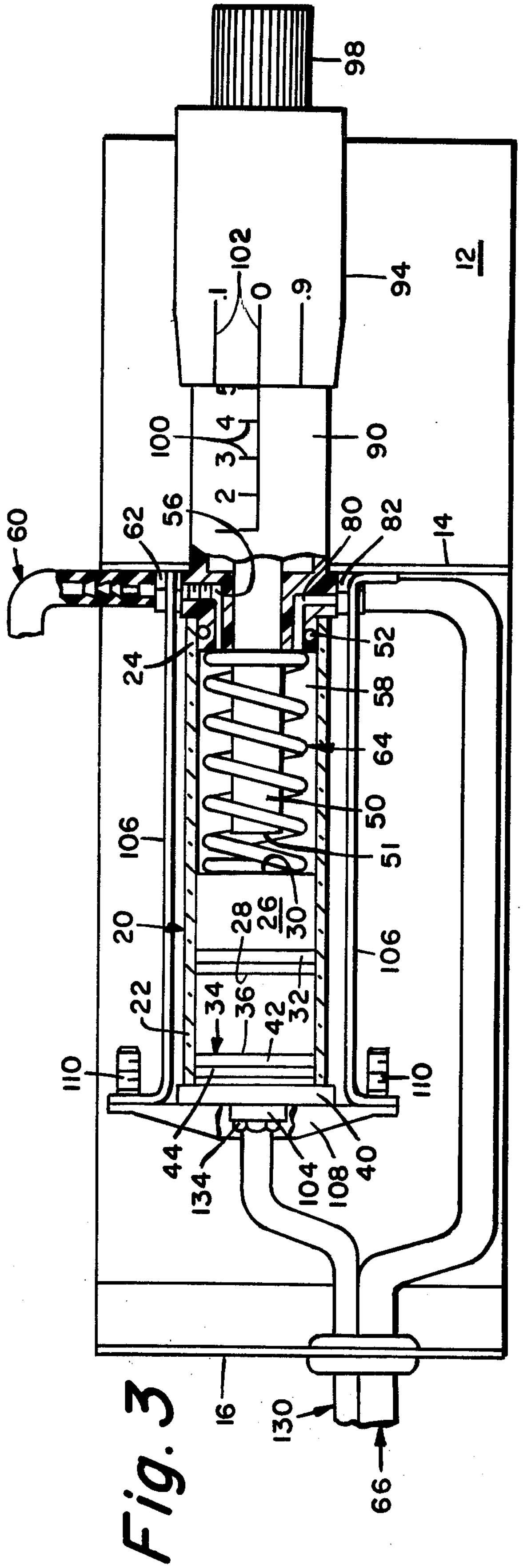
FIG. 3 is a top plan view partially in section of another preferred embodiment of the vacuum-operated syringe subassembly.

Another embodiment of the venting means illustrated in FIG. 3 includes a vacuum source tube 60 connected to the driving chamber 58 through a passageway 56 in plug and flange portions 46 and 48, and a separate venting passageway 80 extending from driving chamber 58 preferably through the opposing side of flange and plug portions of the stop means. One end of the venting tube 66 is connected by a suitable tubular connector 82 to the passageway 80; and the other end of the venting tube communicates with the venting valve portion 136 of the pipet-operating subassembly 120.

The syringe subassembly 10 is preferably provided with means for adjusting the volume or amount of liquid to be pipetted. In the embodiments shown in FIGS. 2 and 3, an axial bore 84 is formed through plug and flange portions 46 and 48. The stop member 50, in the form of a rod or shaft, includes a smooth cylindrical portion 86, having an inner end 51, adapted to fit snugly within the bore 84 and a threaded portion 88 at its outer end. A cylindrical inner sleeve member 90, which may be integral with the flange portion 48, extends from the flange portion 48 coaxially with bore 84 and is provided with a threaded bore section 92 adapted to rotatably receive the threaded portion 88 of the stop shaft 50. By rotating stop shaft 50 into or out of driving chamber 58, the permissible displacement or withdrawal of piston 26 from cylinder dispensing end 22 is correspondingly decreased or increased.

The means for adjusting the longitudinal position of the stop shaft 50 within the cylinder 20 may further include a cup-shaped cylindrical outer sleeve member 94 having an inner diameter greater than the outer diameter of the inner sleeve member 90 and having a threaded axial bore portion 96 adapted to rotatably engage the threaded portion 88 of the stop shaft 50. Lock nut means 98 for adjustably securing the position of outer sleeve member 94 on shaft threaded portion 88 is threadably engaged to the shaft adjacent the outer sleeve 94. As shown in FIG. 3, the sleeve members 90 and 94 may be provided with juxtaposed whole unit and fractional unit scales 100 and 102, respectively. The whole unit scale 100 on sleeve member 90 is preferably linear and aligned parallel to the axis of the sleeve members; it is provided with numerical indicia or markings corresponding to whole units of volume, for example zero through 5 or 10 milliliters. The fractional unit scale 102 on outer sleeve member 94 has circumferential numerical markings provided on the innermost edge of the outer sleeve member 94; the markings correspond to fractional increments of the whole units indicated on scale 100, for example, zero through nine-tenths of a milliliter.

It will be noted that the assembly of shaft 50, inner sleeve 90, outer sleeve 94, and lock nut means 98 is somewhat similar to that used in a conventional micrometer. To adjust the volume to be pipetted by syringe means 10, the user simply rotates outer sleeve 94 inwardly or outwardly to register the fractional unit markings on the outer sleeve scale 102 with the whole unit scale 100 on sleeve 90; the relationship or registration of the scales illustrated in FIG. 3 indicates a setting of the syringe for pipetting 5.0 milliliters.

The distance between the markings on whole unit scale 102 is determined according to the density of the fluid to be pipetted and to the inner diameter of the syringe cylinder 20. To provide for greater accuracy when smaller volumes are to be pipetted, the inner diameter of the cylinder 20 may be minimized and the distance between the whole unit markings on scale 100 (and thus, the length or stroke of longitudinal displacement of the piston) may be proportionally increased. It will be appreciated that if the distance between the whole unit markings on scale 100 were to be longitudinally or axially increased or decreased, it would be necessary either to increase or decrease the pitch of the mating threads on the shaft 50 and sleeve portions 84 and 92, as may be readily calculated according to well-known geometrical formulae.

The syringe subassembly 10 includes a bracket structure preferably extending from front panel 14 for supporting cylinder 20 and for securing plug member 34 and stop means 45, respectively within the dispensing and driving ends of the cylinder. The front face 14 of the housing has an opening adapted to permit the inner sleeve portion 90 to extend therethrough, with the front face 14 abutting against flange portion 48 of the stop means 45. Two brackets 106, which may be welded to front face 14, extend from front face 14 parallel to base portion 12. As shown in FIGS. 2 and 3, plug means 34 may include a cylindrical extension 104 having an outer diameter smaller than the outer diameter of flange portion 40. A securing member or brace 108 having an opening adapted to receive the cylindrical extension 104 of plug means 34 and abutting against the flange portion 40 of plug member 34 is secured to brackets 106 by suitable fasteners 110, thereby holding plug means 34 and stop means 45 within cylinder 20 and also maintaining the cylinder assembly within the housing.

The pipet-operating subassembly 120 shown in FIGS. 1, 1*a*, and 4 includes a pipet-retaining portion 122 having longitudinal socket means 124 for retaining an upper or top open end 152 of a pipet 150, blocking means 126 disposed within the upper end of the socket means 124 for limiting the insertion of the pipet top end into the socket means, and a passageway 128 connecting with the upper end of the socket means formed transversely through pipet retainer portion. One end of a flexible suction and pressure tube 130 is connected to the retainer means passageway 128 by a suitable tubular connector 132. The other end of tube 130 is connected to the dispensing passageway 38 in the syringe plug means 34 by a suitable coupler 134.

The pipet-operating subassembly 120 may also include a venting valve means or portion 136 integrally formed with and directly overhead the pipet retainer portion 126. The venting valve portion 136 is provided with a passageway 138 preferably having a vertical section extending downwardly and coaxially with retainer socket 124 from an orifice 140 formed in an upper surface of the venting valve portion 136, and a transverse section extending from the vertical section. One end of the venting tube 66 is connected to the transverse section of venting valve passageway 138 by a suitable connector 142; and, as mentioned above, the other end of venting tube communicates with either the venting leg 78 of the T-connector 68 of the embodiment of the syringe subassembly shown in FIG. 2 or the venting passageway 80 formed in the stop means plug and flange portions of the embodiment of the syringe depicted in FIG. 3.

The pipet or vessel 150 comprises a fluid receiving chamber having an open upper end 152 and an open bottom tip or end 154. It may be conventional vertically elongated glass or rigid plastic pipet having a cylindrical upper end 152, in which event socket means 124 may comprise a cylindrical socket made from a resilient deformable material, such as rubber or the like, adapted to form an air-tight seal with the upper end 152 of the pipet 150. Alternatively, the socket means may be made from a rigid material, such as plastic or metal, and may include a cylindrical socket and resilient packing or sealing means, such as an O-ring, disposed within a circumferential groove formed within the cylindrical socket.

The pipet or vessel 150 may be made from a flexible or deformable material, such as plastic tubing. It is not essential that the pipet have precise internal dimensions or volumetric indicia on its outer surface. The pipet may be transparent or opaque. It will be appreciated that the precision with which fluid is pipetted by the present apparatus is determined by the volumetric accuracy of the syringe means rather than the pipet itself.

To assure that the fluid to be pipetted does not contaminate the pipetting apparatus, a filter means 156, such as a sterile cotton wad, may be enlodged in the upper end 152 of the pipet.

The vacuum source or fluid suction generating means of the present invention may be a conventional vacuum pump which preferably continuously supplies fluid suction to said driving chamber 58. For example, a small portable electric pump made by Bell and Gossett (Model No. V-220) was found to be suitable; it generated a partial vacuum or negative pressure of about 5 pounds per square inch. It should be noted that when fluid suction is supplied continuously to the syringe, the venting valve means 136 is normally open, i.e., the valve means is normally open to the atmosphere and must be closed in order to withdraw piston 26 and thus pipet liquid.

The operation of the pipetting apparatus depicted in FIGS. 1 through 4 will now be explained in detail. The user inserts a pipet 150 of a suitable volume into the pipet-retaining portion 122 and sets the volume to be pipetted by dialing the outer sleeve member 94 of the syringe 10, as described above. Then, as shown in FIG. 1*a*, the pipet-operating subassembly 120 may be grasped between the thumb and fingers, with the forefinger free to move above the orifice 140 to the venting valve portion 136. The manner of grasping the pipet-operating subassembly 120 is similar to that used in mouth or manual pipetting. While maintaining the forefinger well above the orifice 140, the open bottom tip 154 of the pipet is then inserted into the liquid 8 to be pipetted.

When orifice 140 is open to the atmosphere, the fluid suction or negative pressure applied to the driving chamber 58 is substantially vented through the venting tube 66. The fluid suction may not be completely vented through orifice 140 but in both embodiments of the venting means, shown in FIGS. 2 and 3, the air pressure in the driving chamber portion 58 of the cylinder may be reduced somewhat below the barometric or ambient air pressure exerted on the liquid 8 to be pipetted. Spring means 64 may therefor exert an initial counterbalancing compressive force on the piston 26 to maintain the piston 26 at an initial position adjacent dispensing end plug means 34. To reduce the amount of fluid suction applied to the driving chamber 58 when the venting valve orifice 140 is open, the embodiment of the syringe shown in FIGS. 2 and 2*a* includes a flow restrictive means 162 within the leg 72 of the three-way connector 68 coupled to the first segment 70 of vacuum tube 60. The alternative embodiment shown in FIG. 3 includes a venting passageway 80 which is preferably larger than the vacuum-supplying passageway 56, thereby tending to more readily vent the driving chamber portion 58 and thus increasing the air pressure within the driving chamber portion 58. It will be appreciated that the reduction of the fluid suction applied to (or conversely the increase in air pressure within) the driving chamber portion 58 permits the use of a spring means 64 which exerts a smaller initial counterbalancing compressive force on the piston.

To aspirate the selected volume of liquid 8 into the pipet 150, the forefinger is pressed against the valve portion orifice 140, thereby causing the fluid suction to be essentially directly applied to the driving chamber portion 58. In response to the reduction of air pressure behind the piston 26 and thus the relatively grater pressure exerted on the dispensing face 28 of the piston, the piston is forced rearwardly until it abutts the inner end 51 or stop member 50, thereby aspirating a preselected volume of liquid 8 into pipet 150. Specifically, the force exerted on the dispensing face 28 results from the barometric or ambient air pressure exerted on the liquid 8 to be pipetted and the hydrostatic pressure at the pipet bottom tip 154 exerted by the liquid 8 itself; the combined pressure forces the air between the liquid and the piston (within the pipet 150, pipet retainer portion passageway 128 and fluid and suction tube 130) to be exerted against the dispensing face 28 of piston 26. On the other hand, when the spring means 64 is helical, the force exerted on the piston driving face 30 by the spring increases as the spring is compressed. It will be appreciated that the fluid suction applied to the driving chamber portion 58 of the cylinder 20 must be sufficient to overcome the compressive force exerted by the spring means 64 when the stop member is longitudinally positioned for the maximum volume to be pipetted.

Next the filled or charged pipet is removed from the liquid 8 and moved to the location where the liquid within the pipet is to be transferred. As the pipet 150 is lifted from a submerged position within the body of liquid, the hydrostatic pressure exerted by the liquid 8 is commensurately reduced and consequently a small amount of liquid flows from the pipet. The quantity of liquid remaining in the pipet 150 after complete withdrawal from the body of liquid is, of course, proportional to the volume of air displaced from the pipet into the cylinder 20 by the rearward movement or withdrawal of the piston 26.

To discharge the liquid, the forefinger is removed from the orifice 140, thereby venting the fluid suction applied to the driving chamber portion 58 and causing or permitting spring means 64 to urge the piston 26 to return to its initial position. The pressure exerted by the piston 26 forces the liquid from the pipet. The rate of discharge of the liquid depends, of course, on the force exerted by the spring means 64 and on the rate at which the air pressure within the driving chamber portion 58 returns to its vented condition. It will be appreciated that when the spring means 64 is a helically coiled spring, the force exerted by the spring diminishes as the piston 26 approaches the dispensing end plug member 34; accordingly, the force applied by the piston 26 on the liquid 8 within the pipet 150 diminishes as the liquid is discharged from the pipet, thereby metering the flow of liquid from the pipet to minimize the possibility of aerosols forming as the fluid is discharged.

Also, as mentioned above, the restrictive means 162 within the first leg 72 of the T-connector 68 shown in FIG. 2 tends to reduce the initial fluid suction applied to the rear of piston 26 in chamber portion 58, and accordingly permits the use of a spring means 64 which exerts a relatively smaller amount of initial compressive force on the piston 26. The use of a weaker spring results in a reduction of the rate of discharge of the fluid.

On the other hand, the rate at which the air pressure within the driving chamber portion 58 of the cylinder returns to its vented condition is metered by the restrictive means 162 within the T-connector 68 and by the venting tube 66 itself. The tube walls of the venting tube 66 and the restrictive means 162 provide resistance to the flow of air from the atmosphere into chamber 58 when the orifice 140 to the venting valve is uncovered. Thus, the restrictive means and the venting tube both retard the rate at which the driving chamber portion 58 of the cylinder returns to its vented condition, and thus further meters the flow of liquid from the pipet to prevent the formation of aerosols.

The zero reading of pipetting apparatus shown in FIGS. 1, 2 and 3 may be accurately corrected for changes in the ambient air pressure. First, the outer sleeve 94 of the syringe subassembly 10 is set to pipet a specific volume of a particular liquid, the weight of such volume being known. Second, the liquid is pipetted and weighed. Third, if there is a discrepancy between the weight of the pipetted fluid and the known weight, the lock nut means 98 is loosened and the position of outer sleeve 94 on shaft 50 is varied to compensate for the error; sleeve 94 is rotated inwardly if the weight of the fluid is less than the known weight, or vice versa. Fourth, the lock nut means 98 is tightened to secure the position of outer sleeve member 94 on the stop shaft. Then the accuracy may be confirmed; and, if necessary, finer adjustments may be made.

When a plurality of the pipetting apparatuses of the present invention are utilized with a single vacuum source, a second restrictive means 160 may be employed within the third leg 74 of the T-connector 68 connected to the second segment 76 of the vacuum source tube. The second restrictive means 160 acts to restrict the fluid suction applied to or directed through the venting tube 66 when the syringe is in its vented mode and thereby minimizes the load on the vacuum source demanded by the pipetting apparatus which are in their vented modes (e.g., not in use).

It will be appreciated that the pipetting apparatus of the present invention is simple and convenient to operate, especially in restricted areas, such as under biological containment hoods. Extremely precise volume control is provided by the combination of the precisely formed cylinder bore and an infinitely adjustable stop means. Furthermore, the syringe may be conveniently adjusted to correct for barometric pressure changes. The pipetting apparatus is especially useful in safely transferring biological liquids because the rate of discharge of the device may be controlled to preclude aerosols from being formed. Also, since the liquid is retained in the pipet and does not enter the pipet-retaining portion or suction and pressure tube, the possibility of cross-contamination of consecutively pipetted liquids is prevented, and the necessity of cleaning elements of the apparatus (other than the pipet, which may be discarded after use) is avoided.

The present invention may be used with pipets having no volumetric markings and having liquid receiving chambers which are somewhat arbitrarily formed, that is, without precisely formed inner bores. Thus, very inexpensive disposable pipets may be used with the present apparatus without affecting the accuracy of the volumes to be pipetted.

It will be understood that the embodiments of the apparatus of this invention may be employed in ways and forms different from the above-described embodiments of this invention without departing from the spirit and scope of the appended claims.

I claim:

1. An apparatus for aspirating a selected quantity of liquid into a pipetting vessel having an open top end and an open bottom tip and for discharging said quantity of liquid from said vessel comprising, a vessel for transferring a selected quantity of liquid having an open top end and an open bottom tip for admitting and discharging said liquid; socket means for removably engaging said open top end of said vessel; a tube, having one end connected to said socket means, for supplying suction and thereafter pressure to said vessel top end; a cylinder having a dispensing end and a driving end; plug means for sealing said cylinder dispensing end, said plug means having a passageway formed therethrough connected to said tube; a piston member within said cylinder in a sliding fluid-tight relationship with said cylinder, said piston member having a dispensing face opposing said plug means within said cylinder dispensing end and a driving face opposing said cylinder driving end, with a portion of the cylinder between said piston driving face and said cylinder driving end forming a driving chamber; spring means within said driving chamber abutting said piston driving face for urging said piston toward said cyinder dispensing end; means for supplying subatmospheric pressure to said driving chamber to withdraw said piston against said spring means and toward said cylinder driving end, thereby aspirating liquid into said vessel through the bottom tip thereof; means for stopping the withdrawal of said piston at a predetermined distance from said cylinder dispensing end, said distance being predetermined to cause said vessel to be partially filled with said selected quantity of liquid; means for selectively venting the subatmospheric pressure supplied to said driving chamber to permit said spring means to urge said piston toward said cylinder dispensing end, thereby discharging said selected quantity of liquid from said vessel; and, said venting means including flow restrictive means for metering the rate at which said subatmospheric pressure is vented from said driving chamber, whereby said liquid is discharged from said vessel at a metered rate.

2. The apparatus of claim 1 wherein said means for supplying subatmospheric pressure to said driving chamber includes means for generating a partial vacuum and a fluid suction tube communicating between said generating means and said driving chamber; and said means for selectively venting said subatmospheric pressure includes a venting tube connected to said fluid suction tube, and venting valve means connected to said socket means for selectively opening and closing said venting tube to the atmosphere.

3. The apparatus of claim 1 wherein said means for supplying subatmospheric pressure to said driving chamber includes means for generating subatmospheric pressure and a fluid suction tube communicating between said means for generating subatmospheric pressure and said driving chamber; and said means for selectively venting said subatmospheric pressure includes a venting tube communicating with said driving chamber, and venting valve means connected to said socket means for selectively opening and closing said venting tube to the atmosphere.

4. The apparatus of claim 1 wherein said spring means is a helically coiled spring.

5. The apparatus of claim 1 wherein said means for supplying subatmospheric pressure to said driving chamber continuously supplies such subatmospheric pressure, and said means for selectively venting said subatmospheric pressure is selectively open to the atmosphere.

6. The apparatus of claim 1 wherein said means for stopping the withdrawal of said piston includes a plug portion secured within said cylinder driving end, said plug portion having an inner face abutting said spring means and having a passageway formed therethrough for supplying subatmospheric pressure to said driving chamber; and, a stop member extending a preselected distance from said plug portion into said driving chamber.

7. The apparatus of claim 6 further comprising means for adjusting the distance which said stop member extends into said driving chamber.

* * * * *